United States Patent [19]

Collins

[11] 4,104,440

[45] Aug. 1, 1978

[54] METHOD FOR MAKING PACKAGING PARTICLES AND RESULTING PRODUCT

[75] Inventor: Frederick H. Collins, Thousand Oaks, Calif.

[73] Assignee: Valcour Imprinted Papers, Inc., Glens Falls, N.Y.

[21] Appl. No.: 773,672

[22] Filed: Mar. 2, 1977

Related U.S. Application Data

[62] Division of Ser. No. 632,073, Nov. 14, 1975, Pat. No. 4,042,658.

[51] Int. Cl.$^2$ ............................................. B32B 27/00
[52] U.S. Cl. .................................... 428/402; 206/523; 206/584; 428/315; 428/521; 428/523
[58] Field of Search ................ 206/523, 584; 428/402, 428/315, 521, 523

[56] References Cited

U.S. PATENT DOCUMENTS

| | | | |
|---|---|---|---|
| 3,400,037 | 9/1968 | Sare et al. | 428/534 |
| 3,481,455 | 12/1969 | Graham et al. | 206/584 |
| 3,530,213 | 9/1970 | Isle | 264/321 |
| 3,632,705 | 1/1972 | Makowski | 264/53 |
| 3,723,237 | 3/1972 | Fuss | 428/33 |
| 3,896,934 | 7/1975 | Graham et al. | 206/523 |

Primary Examiner—William J. Van Balen

[57] ABSTRACT

The invention relates to sheet-like plastic packaging particles formed with a normally curved configuration having two spaced apart, curved, coextensive surfaces, one of said surfaces being a substantially unfoamed skin and the remainder of said particle including the other surface being foamed, and to methods for producing packaging particles which comprise warped or distorted, foamed sheet particles suitable for use as packaging particles from an extrudable, expandable synthetic plastic material, such as, a polymerized vinyl aromatic monomer, e.g., styrene, comprising the steps of extruding a foamed sheet of the material while chilling one surface thereof more rapidly than the other surface thereof as it is extruded to form on said one surface a skin of substantially unfoamed material or of higher density material than said other surface and the remaining portions of the sheet, thereafter, cutting said sheet to form sheet like pieces of the desired configuration and subjecting said pieces to heat at a foaming temperature to cause further foaming and distortion of said pieces to form a curved configuration.

5 Claims, 3 Drawing Figures

METHOD FOR MAKING PACKAGING PARTICLES AND RESULTING PRODUCT

This is a division of application Ser. No. 632,073, filed Nov. 14, 1975 now U.S. Pat. No. 4,042,658.

BACKGROUND OF THE INVENTION

1. Field of the Invention

The invention relates to particulate packing material for use as dunnage for providing protection to articles during shipment by absorbing shocks and by isolation of the articles from the walls of the shipping containers by means of the packaging particles. The invention is based on the discovery that extruded foamed sheet of polymerizable vinyl aromatic monomers, such as styrene, having a skin on only one surface thereof can be caused to warp or distort to provide curved configurations by the application of heat at temperatures at and above the foaming temperature. The present invention is also based on the discovery that the direction of axial orientation of the sheet in respect to the longest or shortest dimension (not thickness) of the particle effects the shape and ultimate curved configuration of the warped or distorted packaging particle after heating. Thus, small strips of foamed thermoplastic sheet having a skin on one side only and having a major dimension in the machine direction, e.g., in the direction of extrusion, provides substantially different shapes and curved configurations than particles made by heating strips cut from foamed sheets transversely to the machine direction. Furthermore, it was discovered that packaging particles made by heating strips cut from such foamed sheets on a bias to the machine direction are significantly different in shape from either of the above-mentioned particles and that packaging particles made by heating plastic sheet pieces having no longest or shortest dimensions are also significantly different in shape than any of those mentioned above.

The present invention permits the production of packaging particles which are free-flowing, which do not tend to interlock and which are of exceedingly low bulk density.

The present invention is particularly adapted for use in those circumstances where the foamed sheet having a skin on only one side thereof is produced at one location and sent to the location or area where the packaging particles will be made and used. In this manner, considerable shipping space and expense as well as storage space and expense is conserved because the foamed sheet disposed in rolls does not take up nearly as much space as the shaped, curved particles. At the use location or area, when the need arises for packaging particles, the rolls can be cut into the desired flat shapes and then heated to the foaming temperature or above to cause further distortion or warping and foaming of the particles into the desired curved configuration. The foamed sheet can be cut into any desired patterns to produce various and sundry shapes and configurations. Additionally, adjustments to the biaxial orientation and the relation of the major and minor dimensions (not thickness) to the direction of orientation can result in an even greater variety of different forms and curved configurations.

The present invention is carried out by forming on a plastic sheet being extruded a skin of higher density material than the remaining portions of the sheet. The advantages and benefits of the invention are not obtained when no skin is formed on either surface of the sheet and are not obtained when a skin of substantially the same density is formed on both surfaces of the sheet. The advantages and benefits of the invention result only when the skin of high density material is formed on just one but not both surfaces of the foamed extruded sheet.

2. Description of the Prior Art

There exists a worldwide market for a product generally referred to as packaging particles or plastic dunnage. Other terms for the product are "loose fill" and the "free flow". The first product used in this application was popcorn. Present day packaging particles are usually made of polystyrene foam. More specifically these particles are made of a very small celled foam with an actual density of approximately 1 pound per cubic foot. They are reduced to this density from their extruded, expanded form by passing the extruded, expanded form through a steam expander such as that which is used in the steam chest molding process of molding foamable polystyrene beads. The expander is a unit which subjects the particles to direct steam action which is very effective in reducing the density of polystyrene foams.

Many attempts have been made to provide packaging particles and particles made from plastics, such as foamed polystyrene, have been marketed. U.S. Pat. Nos. 3,723,240, 3,400,037 and 3,251,728 and the patents mentioned therein, illustrate the prior attempts to produce packaging particles some of which have been marketed and others of which have not. U.S. Pat. No. 3,723,240 describes several of these prior art attempts. This patent itself relates to the treatment of foamable strands of polystyrene to impart asymmetry to the strand prior to expansion by heating, that is, the strand is treated on one side thereof so that it expands on that side to a lesser degree. The treatment can be a scraping treatment, a heat-deforming treatment, the application of a plasticizer, and the positioning of a relatively non-foaming or relatively low foaming element eccentrically in the strand. During subsequent heat treatment, the elongate strand forms a foamed coil strand having a helical configuration. This patent, however, fails to disclose or suggest the utilization of foamed but still foamable sheets of thermoplastic resins, such as styrene and having only one surface thereof formed with a skin, or more dense layer, to produce a wide variety of different configurations. Furthermore, the production rate of the method of this patent is comparatively low whereas the packaging particles of the present invention can be produced at much greater rates of production.

U.S. Pat. No. 3,400,073 teaches a method for making packaging particles by extruding filaments, rods, or strands followed by slicing same and heating the sliced chips to expand same. The method of this patent is limited to low production rates as compared to production rates of the method of the present invention. In addition, the resulting packaging particles possess a relatively higher bulk density than some of the other prior art particles.

Other patents in the field of producing packaging particles include U.S. Pat. Nos. 3,026,273, 3,188,264, 3,281,895, 3,723,237. Additional patents in this general area are U.S. Pat. Nos. Re. 27,243, 3,066,382, 3,481,455, 3,829,269, 3,855,053, and 3,887,672.

Furthermore, the production of foamed sheets having a skin of unfoamed material, or of a higher density material than the remainder of the sheet thickness, has been known for many years as illustrated by U.S. Pat. Nos.

3,311,681 and 3,560,600, the disclosures of which are incorporated herein by reference. These patents produce a foamed plastic sheet by extruding an expanded tube or bubble of polystyrene foam sheet and contact one surface of the tube with cooling gas or cooling surface to congeal that surface with little or no foaming while the remainder of the tube thickness and the other surface continues to foam. There is no teaching or suggestion in these patents to cut the resulting foam sheet into sheet-like pieces and subject same to heat to post-expand them.

There has been much patent activity in the packaging particle field. Almost all of the patents have had to do with the shape of the particle inasmuch as the goal is to further reduce the bulk density of the particles to at least as low as 0.5 pounds per cubic foot. Bulk density is measured by placing the particles loosely in a cube container such as a 12 inches × 12 inches × 12 inches box. The weight of the particles for this cubic foot volume is the bulk density and includes the air voids around the particles. Therefore, a particle with a shape that allows for much void area would have substantial economic value since the product is measured and used on a volume basis rather than a weight basis. Hence a useable particle with the lowest bulk density is most desirable. Most of the patents mentioned above relate to extruded strands of a constant cross section. These cross-sections are circular (Alta-Pak), a muted "S" (Pelapan Pak), a trilobular (Pakon, Tektronix) and a double tube or an 8 shape (Foam-Pak). All of these are strands extruded continuously and passed through a cutter station so that the constant cross section strand is cut into one half inch or so lengths. There are variations to this cutting length since some products are produced so that in the unfoamed state they may be ⅛ to ¼ inch in length. Other products are sliced and curl during the post-expansion. It is these cut-off sections of foam particles that are post-expanded as mentioned earlier.

One of the more serious problems with the just mentioned prior art particles is production rate. Since the expansion is great, the actual orifices from which they are extruded are quite small. A single orifice will produce about ten pounds per hour. A small extruder runs with seven such strands for a total production rate of 70 pounds per hour. This is typical of the size extruder and rates used in producing the prior art particles. A foam line with a production rate of 300–600 pounds per hour would be almost unmanageable in terms of the number of strands needed for this increased production rate.

By the process of this invention, particles can be produced as fast as any foam line is able to run. In other words, if a 4½–6 inches dual extruder foam line is capable of producing 600–700 pounds per hour of foam, then it could produce 600–700 pounds per hour of packaging particles.

One of the other objections to the packaging particle business is the shipping and storage of the prior art particles. A 15 cu ft bag holds only 7½ pounds of post-expanded particles. Therefore, shipping and storage of the prior art particles can be an immence undertaking. The process of this invention has the ability to overcome this problem too.

SUMMARY OF THE INVENTION

A conventional polystyrene foam sheet extrusion line is the basic machinery which can be used in the process of this invention. Such extrusion lines usually use dual or tandem extrusion lines such as a 4½ inch extruder feeding a 6 inch extruder; 3½ inch feeding a 4½ inch extruder and both larger and smaller versions of this tandem concept. Lengthened single screw extruders and twin screw extruders can produce such foam sheet as is required for the process of this invention. A foam sheet extrusion line usually comprises the basic extruder with its associated feeding and gas injection system; a tubular extrusion die, a holding-while-cooling device which can be a sizing mandrel or a trapped air bubble system, draw rolls and sheet winders. An important addition that is needed for the process of this invention is what is usually referred to as "skinning" step or device. That is, by subjecting the foamable extrudate immediately as it leaves the extruder die to a curtain of cold air or contacting the extrudate immediately with a cold surface such as a chilled ring, the surface of the expanding foam can be quickly quenched so that the gas at this surface layer does not expand the polystyrene or expands it to a much lesser extent than the remainder of the extrudate.

This technique has been used heretofore (U.S. Pat. No. 3,311,681) for the purpose of producing a relatively hard surface on the foam so it can be used in making dishes which resist cutting and puncturing by knives and forks. It is also used in the foam egg carton field to produce a smooth surface which accepts printing quite well. Inasmuch as the tubular foam sheet is biaxially stretched as it leaves the die, the unfoamed skin becomes a highly biaxially oriented film, and still is an integral part of the foam sheet structure. As it moves away from the die, the uncooled and expanding cellular foam beneath this skin is not nearly as biaxially oriented since it must be taken off biaxially sufficiently quickly so as to minimize the tendency of the foam to wrinkle or corrugate. This happens when the foam is expanding three dimensionally at a faster rate than it is being stretched during the take away portion of the operation. Consequently, the skinned foam sheet is a composite of a highly oriented, potentially biaxially oriented substantially non-foamed film skin and a low density, low biaxially oriented cellular foam structure.

I have discovered that if this foamed and skinned sheet is cut into small pieces such as one inch by one inch and subjected to a post-expansion technique, such as by contacting with steam, boiling water or radiant oven heat, the pieces will expand in the foam portions of the piece while the skinned or substantially unfoamed surface will contract depending upon the kind and relative direction of orientation it was subjected to. This creates a curled or bent particle having an actual density as low as one pound per cubic foot and sufficient curvature of the particle to provide air voids creating an overall bulk density of one half pound per cubic foot. The key to the process is in subjecting particles cut from "skinned" foam sheet to a post-expansion heat treatment which expands the foam to a low density while causing sufficient shrinkage of the skin portion resulting in curling of the particle to further reduce the bulk density.

The following production equipment can be used in this invention. As stated earlier the foam can be extruded on a standard polystyrene foam sheet line and can be subjected to the skinning effect on one side only, usually the outside, as it is extruded from the die. The sheet can be wound in the usual manner. However, for practical applications, it may be preferable to slit the foam sheet into narrower widths such as 6 to 12 inches, more or less, although this should not be considered a limitation. These widths could be easily fed into available pelletizers which are usually manufactured to cut pellets into one eighth inch pieces. However, by modification as to the number of blades and the ratio of draw roll speed to cutter knives rotation, the length of cut can be changed considerably. Lengths of one quarter inch to one inch would be quite simple to produce. If such a pelletizer were further equipped with slitting knives just before the pelletizing cutter blades, the foam sheet could quickly and economically be cut into the desired shapes. Such shapes could be squares such as one inch by one inch or three quarter by three quarter inch. Also rectangular pieces such as one quarter by one inch or one and a half inches could also be made with this set-up. Also, cutting rolls can be used to cut a wide variety of different shapes which ultimately produce particles of very interesting configurations. Sheets which I cut at 45° to the direction of extrusion, for example, post-expanded into corkscrew shapes.

The control and adjustment of orientation in the foam sheet and the shape of the pieces cut from the sheet can create a wide variety of shapes upon post-expansion. Also, the slitters can be set up to cut a variety of widths instead of only one size. This might be advantageous in creating the lowest possible bulk density. Orientation in the skinned foam sheet can be varied to obtain optimum low bulk density. Adjustments to the blow-up ratio and draw-down or take off speed of the tube or bubble extruded can be used to induce equal or unequal biaxial orientation. For example, a low blow-up ratio and a high lineal or draw down rate could produce foam that is highly oriented in the machine direction (i.e. direction of extrusion). This can be further affected by the degree of skinning given to the foam. If a small amount of cooling air is blown onto the foam, only a thin skin will be created and its ability to contract or cause curvation would be relatively small. If a lot of cooling air or colder air is blown, a heavy skin can be created and it can be highly oriented depending upon how much it is being stretched. Too much skin can create too high a density. It is desirable that there be sufficient skinning to create a curvature shaping action during post-expansion without being detrimental to the overall density. Further versatility can be realized by using rotary cutters having cutter blades of other shapes than straight. For example, chevron or "V" shaped parts can be made with a large serrated blade; also "C" shapes, "W" shapes, half or quarter moon shapes. Placing the many possible shapes in conjunction with varying the orientation and cutting the shapes on a bias from the directions of orientation can produce tremendously versatile packaging particles. The variety of shapes that can be cut from this sheet is unlimited and the choice of these shapes give versatility to the process in terms of dynamic cushioning, bulk density and flow characteristics. It also has considerable marketing potential inasmuch as shapes of the alphabet, numbers, initials, stars and even a variety of shapes cut from the same sheet permits the packaging particles to be produced in ornamental or decorative shapes and configurations.

There is another advantage to the process described herein. It is very expensive to ship the big bags of packaging particles. The rolls of skinned foam could be shipped, either slit to width or as master rolls to distant plants which would have the modified cutters and the steam expanders. Consequently, only the rolls would be stored and when a customer orders packaging particles, they would be made by running the rolls of skin foam through the cutter and expander, put in the large shipping bags and shipped immediately to the customer, thereby minimizing storage space required for this product. The foam rolls could have a bulk density of 2 to 10 pounds per cubic foot as compared to the 0.5 pound per cubic foot of the finished product. Shipping costs would be reduced by the same magnitude.

It is noted that there is a difference in the skinning effect when different blowing agents are used. Freon 12 or Genetron 12 allows the formation of an easily produced skin that renucleates to a microscopic cell size on the skin when it is reheated. Foams made with pentane do not have the renucleation effect as pentane appears to leave the skin surface leaving a substantially unfoamed biaxially oriented film. Pentane or any other suitable blowing agent can be used.

Also, the basic thickness of the foam sheet will have quite an effect upon the cushioning and density characteristics of the resultant packaging particles. Again, this is a part of the versatility of this process as it can be easily modified to fit the cushioning properties required.

It is also possible that a roller cutter could be used that would give unlimited shapes cut from the sheet. Narrow tapes or non-tubular sheets as are described by Winstead, U.S. Pat. No. 3,789,095 can be used as the sheet in this process inasmuch as a skin can be placed on these foam sheets.

The skinned foam sheets utilized herein can be made on a tube die or tape die. The tube die gives us the capability of creating both a lineal and cross orientation, i.e., orientation in the machine direction as well as the direction transverse thereto. Die openings, choice of directions and degrees of orientation, density and cell size can be controlled to create packaging particles of a wide range of unique properties. As stated earlier, the variety of shapes is unlimited.

I have mentioned mostly air as the means used for skinning the foam as it is the most commonly used process. However, skins can be produced on foams by contacting the foam with water or water cooled or chilled metal rings or devices. An interesting concept is to place cooled metal devices both inside and outside of the tubular extrudate in such a manner that the foam was alternately skinned on the two surfaces. In other words, where it had a skin on the outside, there would be no skin on the inside and vice versa. When such a sheet is then oriented and cut into packaging particles, the alternating skins would cause contractions and expansions such that the sheet could have a cross section similar to a sine wave. Rectangular particles could take the post-expanded shape of an "S" with the skin being on the inside of the two curvatures. Cutting this sheet on a bias into the various designs, the possible number of different post-expanded shapes is unlimited. It is also possible that the sheet be made not completely flat. By placing grooves or notches on one die lip or both die lips, a varying thickness of foam or even a corrugate sheet could be made and skinned as described herein. Such a grooved sheet might take up more space and create a lower bulk density. Alternating thick and thin spots can create more air voids and also do unusual things in the distortion caused by the post-expansion. Holes can be cut in the sheet so that a grid was being run through the slitter cutter. Both the parts cut from the grid and the parts cut as the holes could be expanded and used as packaging particles.

The above description refers to polystyrene foam since it does axially orient upon stretching, post-expand with steam and bend with the contraction-expansion phenomenon which imparts curvature to the finished particles. Polyethylene foam does not. However, it can be slit and cut into pieces that can be added to the polystyrene foam particles so as to enhance the packaging characteristics of the overall product.

The foamable thermoplastic resin compositions which can be extruded by the method and apparatus of this invention consists of a thermoplastic resin and a suitable foaming or pore-forming agent. Examples of thermoplastic resins that may be employed include those that can be chilled on the surface to produce a skin which is capable of being axially oriented such that upon post-expansion there results the contraction-expansion phenomenon which imparts curvature to the finished particles.

In general, optimum results are obtained with rigid, relatively non-elastic thermoplastic resins such as homopolymers and interpolymers of vinyl chloride, homopolymers of vinyl aromatic hydrocarbon compounds and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and interpolymers of such vinyl aromatic monomers with other vinyl monomers, e.g., acrylonitrile, or other vinyl monomers copolymerizable with styrene, in which the interpolymer contains at least 70% of the vinyl aromatic hydrocarbon compounds. It is feasible and sometimes desirable to employ a blend of two or more thermoplastic resins such as a blend of styrene and a rubbery polymer, e.g., natural rubber, butadiene-acrylonitrile rubbers and the like. High impact polystyrene prepared by polymerizing monomeric styrene in the presence of a rubbery diene polymer also may be employed advantageously. Moreover, scrap plastic material, e.g., polystyrene comprising trimmings and rejects from other plastic forming operations can be used as well as general purpose or virgin plastics.

Suitable foaming agents for the thermoplastic resins are well known and the selection of the particular foaming agents to be employed will be dictated largely by the particular thermoplastic resin in which it is to be incorporated. It is preferred to employ as foaming agents non-reactive organic liquids which have not more than a slight solvent action on the thermoplastic resin and which volatilize below the softening point of the thermoplastic resin. Such agents include these boiling between 80° F to 200° F. Examples of suitable foaming agents that may be employed include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde, diisopropyl ether, the fluorinated hydrocarbons including the Freons, e.g., Freon 11 ($CCl_3F$) or Freon 12 ($CCl_2F_2$), the Genetrons and the like. Mixtures of blowing or foaming agent can be used, e.g., mixture of a fluorocarbon and pentane. Usually the foaming agent will be employed in the amount of about 2½ - 10 and preferably 5-8 weight percent of the thermoplastic resin.

The thickness of the skinned, extruded, foamed sheet before post-expansion can range from 40 or 50 to 250 thousandths of an inch, preferably 60 to 125 thousandths of an inch and most preferably 90 to 100 thousandths of an inch. The post-expanded product has a thickness of 80 to 100 to 500 thousandths of an inch, preferably 150 to 250 thousandths of an inch. The thickness of the skin itself varies from about 0.25, preferably about 0.5, thousandths of an inch thick on the thinnest post-expanded products to about 5.0, preferably about 3.0, thousandths of an inch thick on the thickest post-expanded products.

There is another unique characteristic of the packaging particles of this invention. All of the prior art particles are substantially equal density throughout. With the skin affect used in this invention there is produced a foam particle which has a soft and resilient material on the outer surface but has on the inner surface a thin layer of almost solid higher density, relatively stronger material which is integrally bonded to the lower density foam. Such a composite structure can be stated to have a more rigid, stronger character and consequently is a superior form of packaging particles. The higher density, relatively stronger "skin" material reinforces the particle to render it more resistant to crushing without sacrifice in bulk density or presentment of a soft side to the article being packaged.

The skinning affect on polystyrene foam is not dependent upon the actual thickness of the overall sheet. Therefore, a skin can be placed on a foam sheet from a minimum of perhaps 0.40 inch or less thickness and on a foam as thick as 0.250 inch or more. This versatility means that with the very same equipment, there can be produced flowable, loose fill cushioning particles of varying bulk density, dynamic cushioning properties, and settling characteristics. The very thin foamed particles of this invention could be used for extremely fragile articles such as missile guidance systems and precision aligned test instruments which require fragility factors of 15 to 25 G's. With increases in thickness, the novel packaging particles can handle rugged machinery with fragility factors above 100 G's. This could be done with the very same density of product. The prior art packaging particles would either have to increase the density and therefore the cost of the product or change to an entirely different shape to create the versatility of handling the full range of extremely fragile to rugged articles. Most packaging particles appear to be less than 1.5 inches in maximum dimension to be free flowing. To get maximum advantage of curvature, particles of 1 to 1½ inches appear to be most desirable. Particles that are too small may not have sufficient curvature or proper shape to create the large air spaces that are needed to create the low bulk density. In the present invention, packaging particles range from about 0.5 inch to about 3.0 inches or higher, preferably about 1.0 to about 1.75 inch in their maximum dimension.

DESCRIPTION OF A PREFERRED EMBODIMENT

Figure 1:
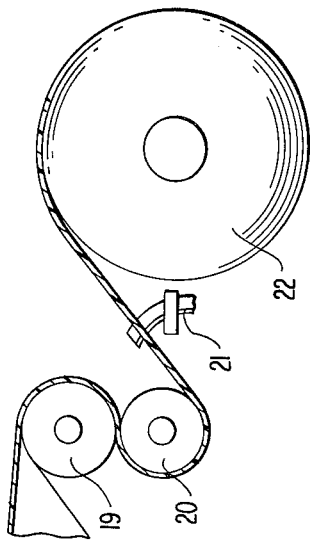
FIG. 1 is a diagrammatic view partially in section and partially cut away of an embodiment of this invention for producing a skinned foamed sheet and slitting it into strips of smaller width.

Referring to FIG. 1, there is shown the delivery end of a conventional screw-type extruder 10 having a circular die orifice 11 and a conical insert 12 around which the melt within the extruder flows before extruding through the die orifice 11 to form a tube of foaming plastic sheet 15. The conical insert 12 also supports a cylindrical sizing mandrel 13 by means of a supporting bar or rod 14 extending in front of the die orifice 11. The screw-type extruder may be of the same type as disclosed in U.S. Pat. No. 3,311,681 which also describes a typical sizing mandrel 13 and supporting rod 14. However, instead of directing cooling air on the inner surface of the extruded, foaming sheet 15 as shown in U.S. Pat. No. 3,311,681, a cooling air ring 16 is provided around the orifice 11 to impinge cooling air on the foaming sheet 15 as it emerges through orifice 11. The cooling air ring 16 is provided with a circular opening 17 along its inner periphery for directing cooling air onto the tube of extruded foaming plastic sheet 15 as it emits from the die orifice 11. The cooling air chills the outer surface of the expanding tube to congeal it and form a skin thereon. The inner surface, however, is allowed to expand to its normal extent and the tube is sized and shaped by the mandrel 13 in the conventional way. The lower side of the tube is slit by slitter 18 and the tube 15 is drawn by draw rolls 19, 20, at the desired rate of speed consistent with the degree of biaxial orientation desired. The draw rolls also serve to flatten the slit tube which is further slit by slitters 21 to form a plurality of rolls of foamed sheet having an unfoamed skin on one surface thereof. These sheets are wound into rolls 22 which then may be stored or shipped to the location of use or immediately used to produce the packaging particles of the present invention.

Figure 2:
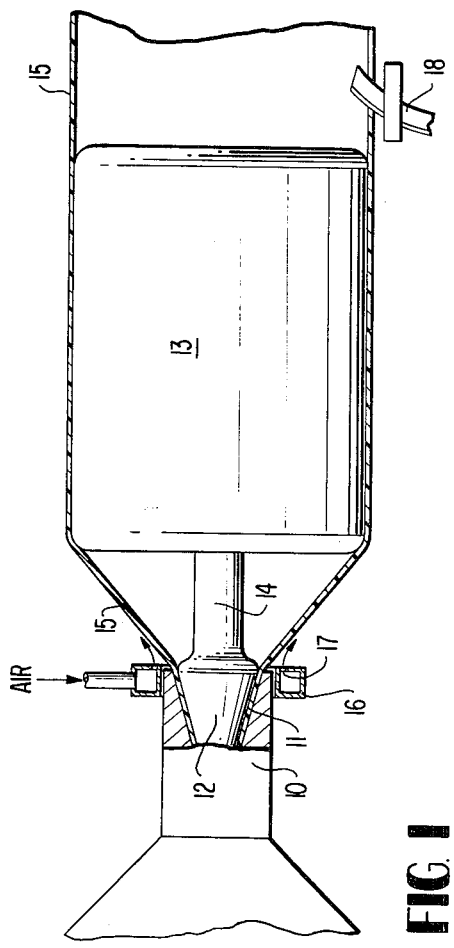
FIG. 2 is a diagrammatic view in perspective illustrating an embodiment of this invention wherein the strips of narrower width produced in the manner shown in FIG. 1 are further slit and cut into particles which are fed to a post-expander where they are post-expanded and thence fed by pneumatic means to storage or packaging.

Referring to FIG. 2, a roll 22 of skinned, foamed sheet is unrolled and passed through feed rolls 23, through a slitting device 24 which slits the sheet into strips and thence to a rotary cutter 25 which chops the strips into pieces 26. The pieces 26 are fed into a funnel-shaped infeed 27 to a pipe 28 of a pneumatic conveyor 29 which delivers the pieces through pipe 30 into post-expander 31 where it is heated, for example, by the live steam, to post-expand the pieces 26 to form the packaging particles 38 of this invention. The thus formed packaging particles 38 exit from the expander 31 through exit tube 32 which delivers them into a funnel-shaped infeed 33 to pipe 34 of pneumatic conveyor 36 which sends the particles 38 through pipe 37 to storage or to a packaging department where the particles 38 are used for packaging other products or where they themselves are packaged in bulk for shipment to a customer or another site of use.

Figure 3:
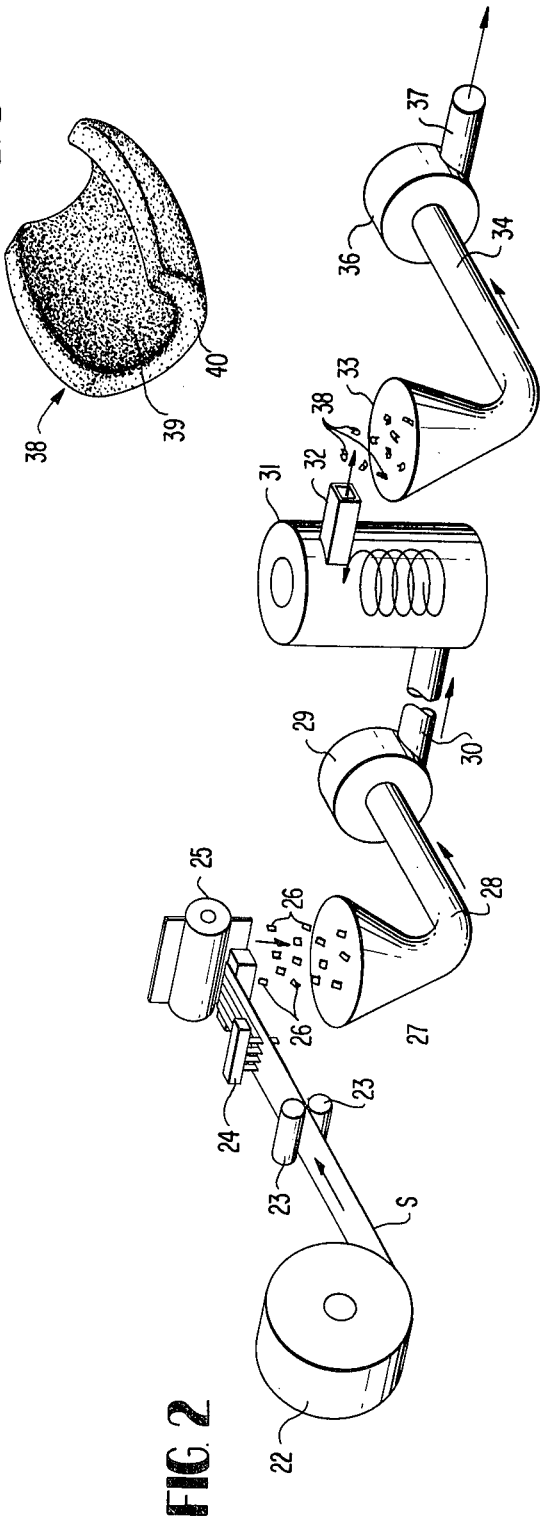
FIG. 3 is a perspective view of one type of particle produced by the present invention.

The packaging particle 38 is shown in perspective in FIG. 3 and includes a skinned concave surface 39. The remainder of the particle 38 comprises a foamed portion 40. The pieces 26 can be cut into any desired configuration such as chevrons, circles, rectangles, squares, triangles, W's, L's, T's, V's, Z's arcuate, zig-zags, four-pointed stars, five-pointed stars, octagons, hexagons, pentagons, any combinations thereof, or any other configuration desired. The curling due to differences in shrinkage and expansion capabilities of the skinned and foamed portions of the pieces 26 during post-expansion provides the potential for producing packaging particles 38 of a very wide variety of different shapes and forms.

EXAMPLE 1

A dual extruder foam extrusion line consisting of a 4½ inch extruder feeding a 6 inch cooling extruder was operating at 600 pounds per hour. Virgin polystyrene was used as a raw material and 6% of Freon 12 (based on the weight of the polystyrene) was injected into the system. The cooling extruder was equipped with a circular die having an opening which was 7 inches in diameter and 0.010 inch thick. There also was utilized a 28 inch diameter sizing mandrel situated in front of the die and spaced therefrom. The extrusion line formed a cylindrically shaped extrusion which passed over the mandrel. The tubular foam extrusion had a diameter of about 28 inches and was slit to produce two sheets of 42 inches width $\times$ 0.100 inch thick. The actual density of the sheets was 5.6 pounds per cubic foot. Fitted around the 7 inch diameter circular die was an air ring that blew cold air on and chilled the outer surface of the foam sheet immediately as it left the die. The air that passed through the air ring was prechilled to 45° F by passing it through a refrigerating unit. The cold air caused a solid skin to form on the foam sheet integral therewith and which measured 1.5 mils or thousandths of an inch thick. The sheets were directed to a dual winder where they were wound and at the same time slit into 14 individual rolls of 6 inch wide sheet. The rolls were stored for 24 hours.

The sheet from one 6 inch roll was then passed through a slitter-cutting device that cut the sheet into chevron shaped packaging particles, 1½ inches wide overall, 1 inch in overall length with an actual width of the arms of the chevron, that was ⅜ inch. From the slitter-cutter, the chevron shapes were pneumatically blown to a steam expander. When subjected to live steam heat in the expander, the chevron particles expanded to a thickness of 310 mils or thousandths of an inch. The differential expansion and contraction caused by the foam part expanding and the skin side shrinking caused a warpage of the chevron so that it took a spherical shape, i.e., as if it had been cut from a sphere having a diameter of 1.25 inches. The actual density of the expanded products was 1.09 pounds per cubic foot and the bulk density of these packaging particles was 0.6 pounds per cubic foot. The packaging particles were free flowing, passing freely through a storage container having a 5 inch diameter loading nozzle.

EXAMPLE 2

(COMPARISON)

This is not an example of the present invention but compares packaging particles made from foamed plastic sheet on which no skin was formed with the packaging particles of Example 1. The same operation as described in Example 1 was carried out with the exception that the air ring was not used. The foam sheet was 0.110 inch thick and had an actual density of 5.0 pounds per cubic foot. Since the air ring was not used, no skin was created on the foam and it was of uniform density and cell structure throughout. Twenty-four hours later when this sheet was passed through a slitting-cutting device, made into the chevron shapes, and passed through the steam expander, all in the same manner as described in Example 1, the chevrons expanded to an actual density of 1.0 pound per cubic foot. However, no distortion was created in these particles and they expanded to basically flat chevrons having a thickness of 325 mils thousandths of an inch 1.7 inches wide overall and 1.25 inches in overall length. The bulk density of packaging particles was 0.8 pound per cubic foot. They did not flow freely through the storage vessel due to excessive interlocking of the particles.

EXAMPLE 3

A 3½ inch diameter screw extruder that had been extended to an L/D ratio of 44 to 1 was utilized to produce polystyrene foam sheet. The raw material used was pelletized polystyrene made from 100% scrap material from the production of foamed polystyrene meat trays and egg cartons, and crystal polystyrene cocktail tumblers and the purgings created from the initial start-up of foam extrusion equipment. The blowing agent comprised of a mixture of 50% Freon 12 and 50% Freon 11. This combination blowing agent was injected into the extruder at a rate of 11.4% based on the weight of polystyrene, creating a foam with an actual density of 2.8 pounds per cubic foot. A 5 inch diameter circular die with a 0.007 inch wide die opening was utilized with a 15.6 inch diameter sizing mandrel to produce a tube of about the same diameter which was slit to provide a single sheet about 48 inches wide. An air ring was placed around the die so that cooling air was impinged on the outer surface of the foam extrudate immediately as it left the die. The same outer surface of the sheet was then immediately made to contact a water cooled hollow cylindrical cooling plate having an internal diameter of 7 inches. The combination of the air cooling and contact with the water cooled metal plate resulted in a foam sheet of 0.075 inch thickness having a skin 0.0025 inch thick integral with the foam sheet. The sheet was directed to a winder where it was slit to 8 inch widths and 6 such rolls were wound. The foam sheet rolls were stored for 48 hours.

A roll of the foam sheet was then passed through a rotary die cutter system which cut the foam sheet into a variety of shapes, including the shapes of the letters L, J and W as well as squares, diamonds and triangular shapes. From the rotary die cutter, the particles were directed to a steam expander wherein the particles expanded and distorted. The particles expanded to an actual density of 0.8 pounds per cubic foot and a bulk density of 0.35 pounds per cubic foot. All of the particular shapes warped extensively in proportion to the primary lineal orientation which was induced into the foam sheet. The packaging particles of the various shapes were free flowing and were used to package light-weight delicate instruments.

EXAMPLE 4

Using the same 8 inch wide rolls produced in Example 3, straight pieces of foam sheet were cut parallel to the axis of extrusion and, respectively, 45° and 30° from the axis of extrusion. Those pieces cut parallel to the axis of extrusion were ⅜ inch wide, cut in lengths of 1½ inches, 2 inches and 3 inches. When placed in boiling water, the 1½ inch pieces distorted to become a portion of a hollow cylinder having a semi-circular cross section, a diameter of 1.25 inches and a width of one half inch. The 2 inch pieces distorted to a hollow cylindrical C-shape having a 1.25 inch diameter with about 270° of the circular cross-sectional shape. The 3 inch piece distorted in boiling water to become a perfect hollow cylinder with the ends actually touching and having a diameter of 1.25 inches. All three shapes were suitable as packaging particles although the semi-circular and C-shaped particles did interlock and therefore did not flow quite so freely.

The pieces cut at a 45° angle were cut 3¾ inches in length by ⅜ inch wide. When subjected to boiling water, these pieces distorted to a corkscrew shape having a pitch of 1 inch and a clearance of ½ inch between the threads. Pitch diameter was 1⅜ inches. The pieces cut at 30° from the axis of extrusion were cut 6 inches in length. These also formed a threaded or corkscrew shape with no clearance between threads. The pitch was ½ inch and its diameter was also 1⅜ inches. The solid skin portion of these pieces took a double concave structure imparting excellent stiffness to the previously described shapes. Since the outer portion of the foam was constructed of a very resilient type foam, a packaging particle of superior quality was created having a strong, stiff solid inner layer covered by a soft resilient foam which is ideal for packaging purposes.

EXAMPLE 5

A twin screw extruder with an L/D ratio of 13½ to 1 and 90 mil. diameter screws was used to produce polystyrene foam sheet, at a rate of 50 pounds per hour. 100% Freon 11 was used as a blowing agent at a rate of 12.1% based on the weight of polystyrene creating a foam sheet having a density of 3.7 pounds per cubic foot. A flat tape die 2 inches in width by 0.025 inch thick was positioned in a downward direction so that one surface of foam extruded from it was immediately contacted with water having a temperature of 70° F. The foam sheet was drawn and oriented extensively in the lineal (machine) direction. The resulting foam sheet was 5 inches wide, 0.125 inch thick and had an integral skin 0.004 inch thick on one surface. The sheet was stored for 48 hours, then fed through a roller die cutter having the random die cutting shape of a jigsaw puzzle to produce randomly cut pieces. When these randomly cut particles were subjected to the steam expander, they distorted with a lineal distortion proportional to the orientation induced into the foam sheet. The particles post-expanded to an actual density of 0.9 pounds per cubic foot and a bulk density of 0.45 pounds per cubic foot. The particles were free flowing and were used to package delicate electronic parts.

What is claimed is:

1. A sheet-like packaging particle comprised of a polymerized vinyl aromatic monomer formed with a normally curved configuration having two spaced apart, curved, substantially coextensive surfaces, one of said surfaces being concave and comprising a substantially unfoamed skin and the remainder of said particle including the other said surface being foamed.

2. Particle as claimed in claim 1 wherein said vinyl aromatic monomer is styrene.

3. Particle as claimed in claim 2 wherein said sheet-like particle has a coil configuration.

4. Particle as claimed in claim 2 wherein said sheet-like particle has a cylindrical configuration.

5. Particle as claimed in claim 2 wherein said sheet-like particle has a sphere-like configuration.

* * * * *